(12) United States Patent
Pientka et al.

(10) Patent No.: US 6,726,414 B2
(45) Date of Patent: Apr. 27, 2004

(54) DEPTH ADJUSTMENT FOR A FIXED BASE ROUTER

(75) Inventors: Matthew James Pientka, Laurens, SC (US); Elton Lee Watson, Greenville, SC (US); Charles Keith Long, Seneca, SC (US)

(73) Assignee: One World Technologies, Limited, Hamilton (BM)

( * ) Notice: Subject to any disclaimer, the term of this patent is extended or adjusted under 35 U.S.C. 154(b) by 22 days.

(21) Appl. No.: 10/245,151

(22) Filed: Sep. 17, 2002

(65) Prior Publication Data

US 2004/0052600 A1 Mar. 18, 2004

(51) Int. Cl.$^7$ ................................................. B23C 1/20
(52) U.S. Cl. ........................ 409/182; 409/210; 409/218; 144/136.95
(58) Field of Search ................................ 409/182, 181, 409/175, 210, 218, 214; 144/136.95, 154.5, 371; 451/344, 358; 30/377

(56) References Cited

U.S. PATENT DOCUMENTS

| | | | |
|---|---|---|---|
| 1,745,780 A | 2/1930 | Casey | |
| 1,899,883 A | 2/1933 | Sacrey | |
| 2,562,143 A | 7/1951 | Godfrey et al. | |
| 2,613,704 A | 10/1952 | Sacrey | |
| 2,842,173 A | 7/1958 | Turner et al. | |
| 2,855,963 A | 10/1958 | Potter | |
| 2,867,251 A | 1/1959 | Moretti et al. | |
| 2,988,119 A | 6/1961 | Godfrey et al. | |
| 3,443,479 A | 5/1969 | Hawley et al. | |
| 3,466,973 A | 9/1969 | Rees | |
| 3,767,948 A | 10/1973 | Batson | |
| 4,051,880 A | 10/1977 | Hestily | |
| 4,108,225 A | 8/1978 | Hestily | |
| 4,319,860 A | 3/1982 | Beares | |
| 4,938,642 A | * 7/1990 | Imahashi et al. | ............ 409/182 |
| 5,078,557 A | * 1/1992 | McCracken | ................. 409/182 |
| 5,094,575 A | * 3/1992 | Kieser et al. | ................ 409/182 |
| 5,176,479 A | 1/1993 | McCracken | |
| 5,613,813 A | 3/1997 | Winchester et al. | |
| 5,853,274 A | 12/1998 | Coffey et al. | |
| 5,988,241 A | 11/1999 | Bosten et al. | |
| 6,419,429 B1 | * 7/2002 | Long et al. | ................. 409/182 |

FOREIGN PATENT DOCUMENTS

JP         05-318409 A    * 12/1993

* cited by examiner

*Primary Examiner*—Erica Cadugan
(74) *Attorney, Agent, or Firm*—Brooks Kushman P.C.

(57) ABSTRACT

A fixed base router is provided comprising a base having a central bore. The router includes an adjusting ring rotatably affixed to a base upper end, being coaxial with the central bore, and having a series of gear teeth formed thereto defining a ring gear. A motor housing, including a motor for imparting rotational motion to a tool holder, is threadably engaged with the adjusting ring. A pinion gear, journaled for rotation relative to the base, is engaged with the ring gear, and is coupled for rotation with a dial extending from the base. The base is adapted to prevent rotation of the motor housing relative thereto, such that rotation of the adjusting ring axially translates the motor housing relative to the base. The router includes a scale and indicator for indicating fine adjustment of the motor housing relative to the base.

17 Claims, 6 Drawing Sheets

DEPTH ADJUSTMENT FOR A FIXED BASE ROUTER

BACKGROUND OF THE INVENTION

1. Field of the Invention

The present invention relates to a fixed base router, more particularly to a fixed base router with accurate depth adjustment.

2. Background Art

A router is a power tool, typically used in woodworking, for applying a rotary cutting action to a workpiece. Particularly, a router is used for slotting, milling, finishing, edging and other rotary cutting operations. Routers that have a base for securing and maintaining the depth of the cutting tool, relative to the base, during the cutting operation are typically referred to as fixed base routers.

Fixed base routers are produced in a variety of different types and configurations. These fixed base routers have various adjustment mechanisms for varying and adjusting the height of a rotary cutting element relative to the base of the router. The cutting element is typically a router bit secured within a tool holder or a router collet and rotationally driven by a motor. Accordingly, the height of the cutting element relative to the base is typically adjusted by varying the height of the motor housing relative to the base.

Conventional fixed base routers typically include a motor housing having an external thread formed thereabout. Accordingly, either the fixed base includes a corresponding internal thread, or an adjusting ring rotationally affixed atop the fixed base has a corresponding internal thread. Thus, the motor housing is threadably engaged to the base or adjusting ring for attaching the motor housing to the fixed base and adjusting the height of the motor housing. Although these types of routers offer adjustment of the motor housing height and cutting element depth, the adjustability may be coarse due to the size of threads required about the motor housing. This coarse adjustment may not be as repeatable and accurate as a woodworker or craftsman may desire.

The industry has recognized a need for a router having an accurate cutting element depth adjustment. This need is evidenced by prior art fixed base routers having relatively fine adjustment or coarse and fine adjustment. However, these prior art fixed base routers having fine and/or coarse adjustments may require many parts thus increasing the manufacturing costs. Additionally, these adjustment provisions may be awkward or tedious to use, due to the positioning of the adjusting mechanism(s). Further, these adjustment mechanism(s) may lead to an increase in size of the fixed base or the motor housing. A simplified fixed base router is needed having a cutting element depth adjustment that is accurate, cost effective, compact and relatively easy to operate.

SUMMARY OF THE INVENTION

An object of the present invention is to provide a fixed base router including a base having a lower planar surface, an upper end, a central bore and a handle affixed thereto. An adjusting ring is rotatably affixed to the base upper end and is coaxial with the central bore. The adjusting ring has a series of gear teeth formed thereto defining a ring gear. A motor housing includes a motor secured therein for imparting rotational movement to a tool holder extending therefrom. The motor housing has an external thread formed thereabout. A pinion gear is journaled for rotation relative to the base and is engaged with the ring gear. The pinion gear is also coupled for rotation with a dial extending from the base. One of the adjusting ring and base has an internal thread formed therein engaged with the motor housing external thread. The other of the adjusting ring and base is adapted to prevent rotation of the motor housing relative thereto, such that rotation of the adjusting ring axially translates the motor housing relative to the base. One of the base and dial includes a scale and the other of the base and dial includes an indicator for indicating a relatively fine adjustment of the motor housing with respect to the base.

DETAILED DESCRIPTION OF THE PREFERRED EMBODIMENT

Figure 1:
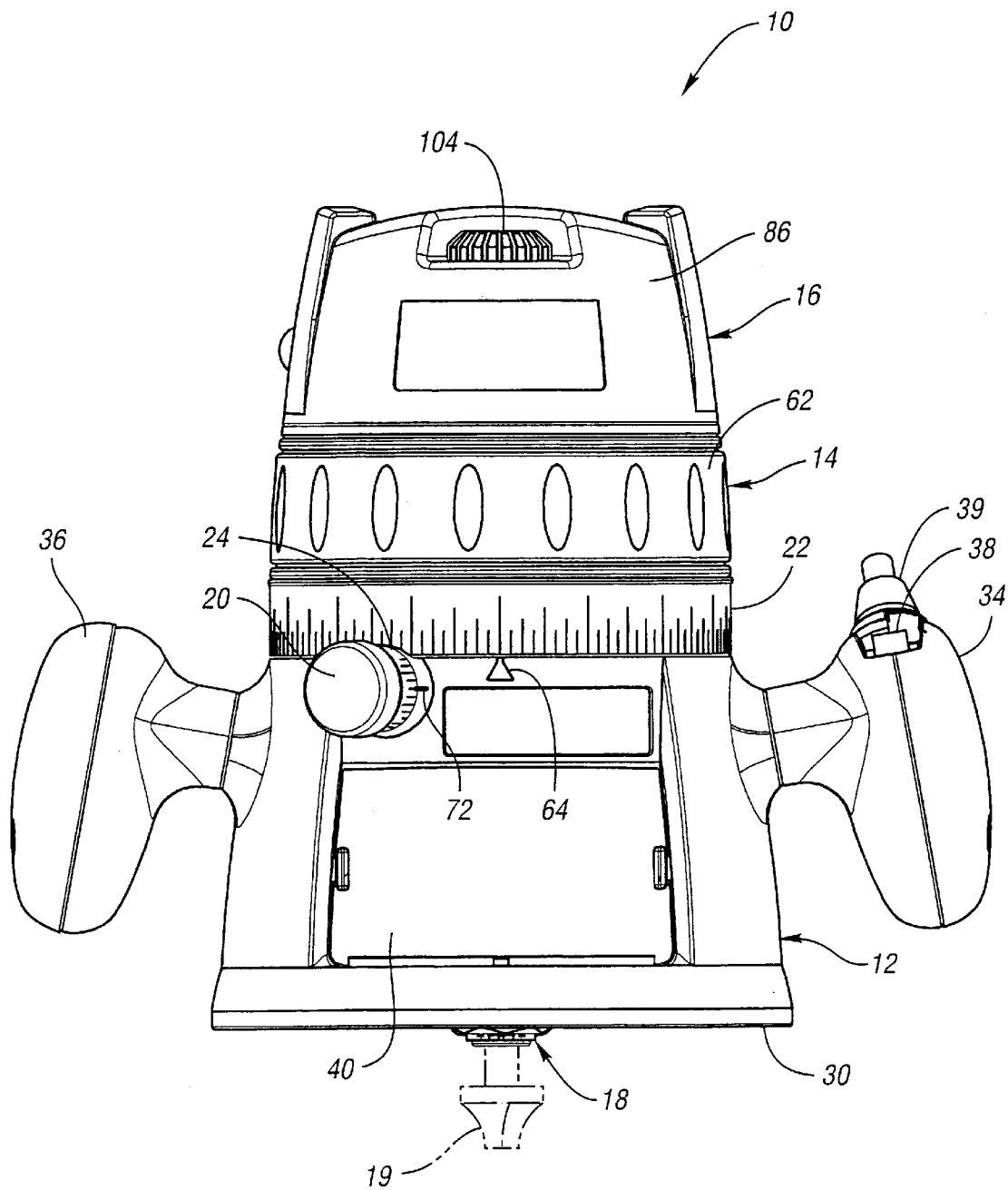
FIG. 1 is a front side elevational view of a fixed base router in accordance with the present invention.

With reference to FIGS. 1–6, a fixed base router is illustrated in accordance with the present invention and referenced generally by numeral 10. The router 10 is a power tool, typically used in woodworking, for rotating a rotary router bit for finishing and cutting a workpiece. The router 10 includes a base 12 for supporting the router 10 and partially enclosing the rotary cutting bit. An adjusting ring 14 is rotatably fixed to the base 12. A motor housing 16 partially extends within the base 12 and includes a tool holder 18 for rotationally driving the router bit illustrated in phantom and referenced by numeral 19. The motor housing 16 cooperates with the adjusting ring 14 such that rotation of the adjusting ring 14 axially translates the motor housing 16 and tool holder 18. This adjustment feature is commonly referred to as router depth adjustment or depth adjustment due to the depth of the tool holder 18 and router bit 19 relative to the plane of base 12 which cooperates with the workpiece. The router 10 also includes a dial 20 extending from the base 12 and cooperating with the adjusting ring 14 and motor housing 16 such that rotation of the dial 20 imparts a slow rotation to the adjusting ring 14 and consequently makes fine adjustment to the height of the motor housing 16 and tool holder 18. The router 10 includes a coarse scale 22 and a fine scale 24 for indicating the respective coarse and fine depth adjustment.

Figure 2:
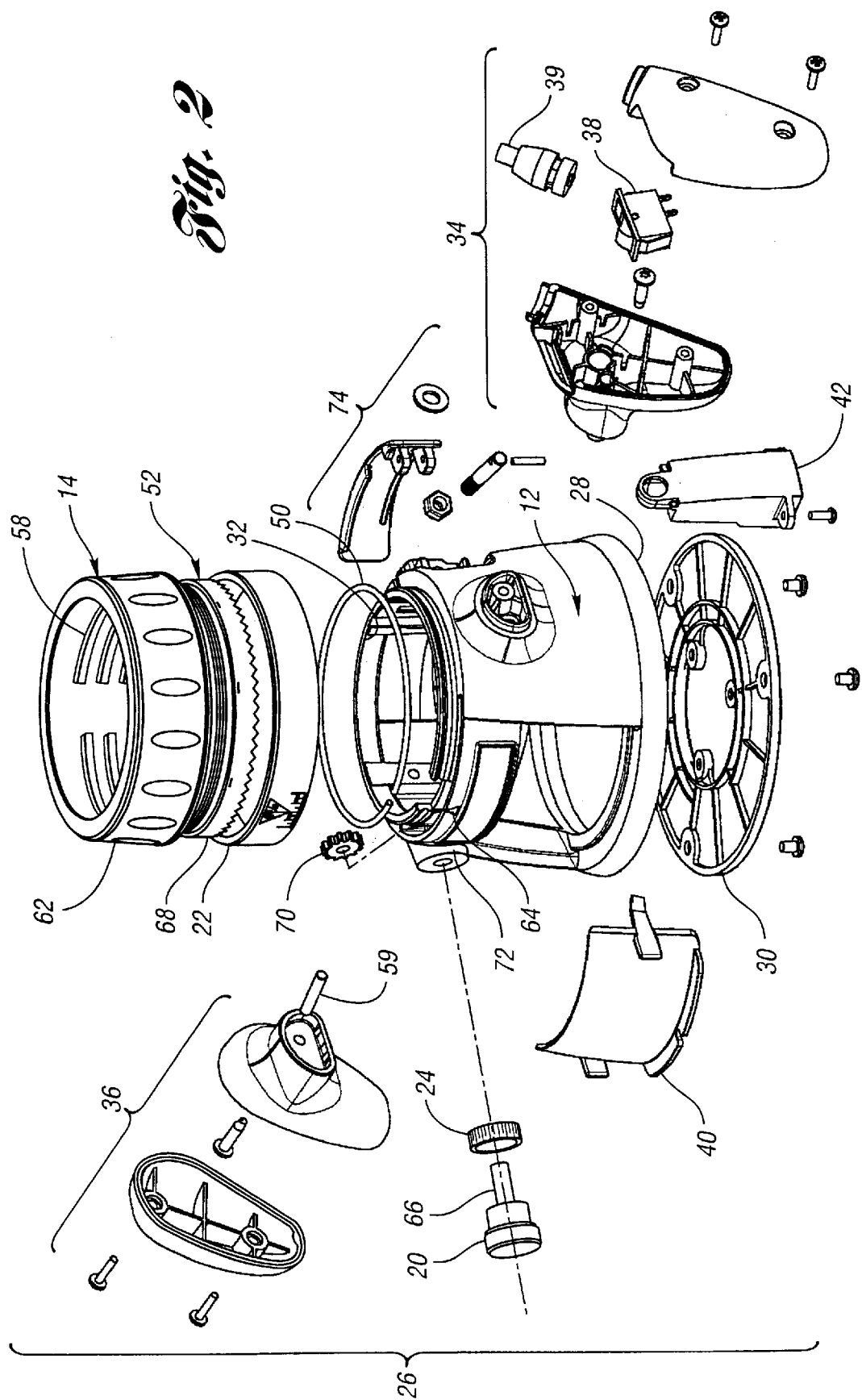
FIG. 2 is an exploded perspective view of a fixed base attachment of the fixed base router of FIG. 1.
Figure 3:
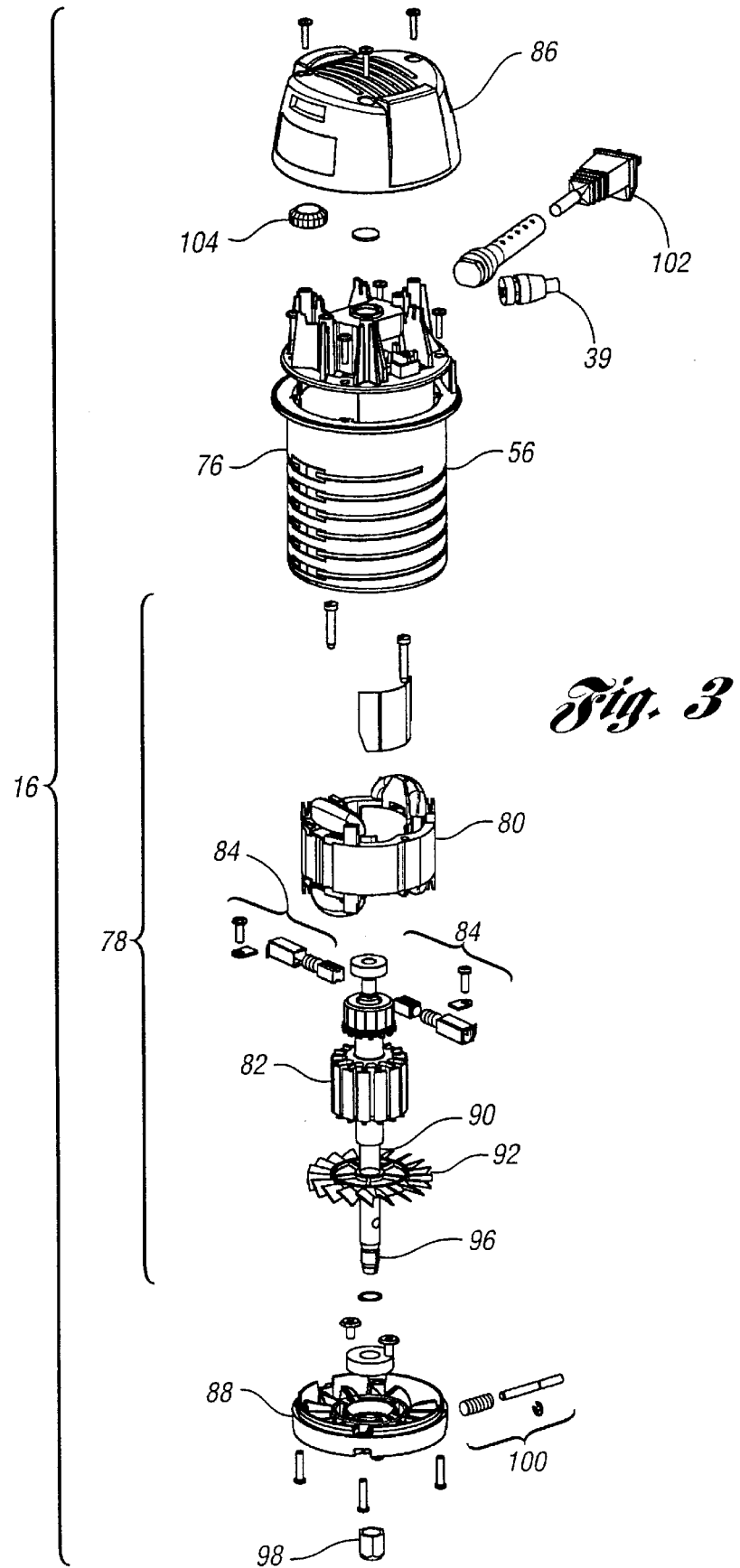
FIG. 3 is an exploded perspective view of a motor housing of the fixed base router of FIG. 1.

The fixed base router 10 is illustrated exploded in FIGS. 2 and 3, with the base 12 and adjusting ring 14 in FIG. 2 and the motor housing 16 in FIG. 3. The base 12 and adjusting ring 14 are collectively referred to as a fixed base attachment 26 for a power tool. The fixed base attachment 26 may be provided with the motor housing 16, the motor housing 16 and a plunge base attachment for a power tool (not shown), or provided separately. The fixed base attachment 26, as illustrated, is typically provided with a motor housing 16 only, as a unitary power tool electrically interconnected together for ergonomic advantages which will be discussed below.

The base 12 has a lower planar surface 28 formed thereto or provided by a sub base 30. The sub base 30 is typically detachable from the base 12 so that it may be replaced subsequent to wear and prolonged use. Additionally, a user may affix a customized sub base to the base 12 for a particular application such as use with a router table or tracing guide. The base 12 has a central bore 32 formed therethrough for receiving a portion of the motor housing 16 extending therein.

The base 12 includes at least one handle affixed thereto. A preferred embodiment fixed base router 10 includes a pair of handles including a power handle 34 and an auxiliary handle 36, each affixed to the base 12. The power handle 34 includes an on/off switch 38 connected to the motor housing 16 by a cable 39. The switch 38 opens and closes a circuit for passing current through the motor housing 16.

The base 12 includes features for providing a line of sight of the user router bit 19. These features include a transparent chip shield 40 oriented within an aperture formed within the base 12. The chip shield 40 is transparent such that a user may see through the aperture in the base 12 without allowing chips or dust to exit the base 12. The base 12 further includes a light assembly 42 for illuminating the cutting element and workpiece during operation. The light assembly 42 may include a plurality of LED's for providing the illumination.

The base 12 has an upper end adapted to receive the adjusting ring 14 attached thereto. As clearly illustrated in FIG. 5, the upper end of the base 12 includes a step 44 which is formed generally parallel with the bottom surface 28 and is formed around the periphery of the central bore 32 and generally coaxial therewith. An annular projection 46 extends from the base 12 coaxial with the central bore 32 for attachment of the adjusting ring 14. Additionally, the annular projection 46 has a groove 48 formed around its exterior surface sized to receive a retainer such as a spline 50. The adjusting ring 14 has a lower annular region 52 sized to receive the annular projection 46 therein. Further, the lower annular region has a corresponding groove 54 also sized to receive the spline 50. The spline 50 retains the adjusting ring 14 relative to the base 12 for rotational motion relative thereto. The spline 50 may be formed of a nylon monofilament line.

Figure 5:
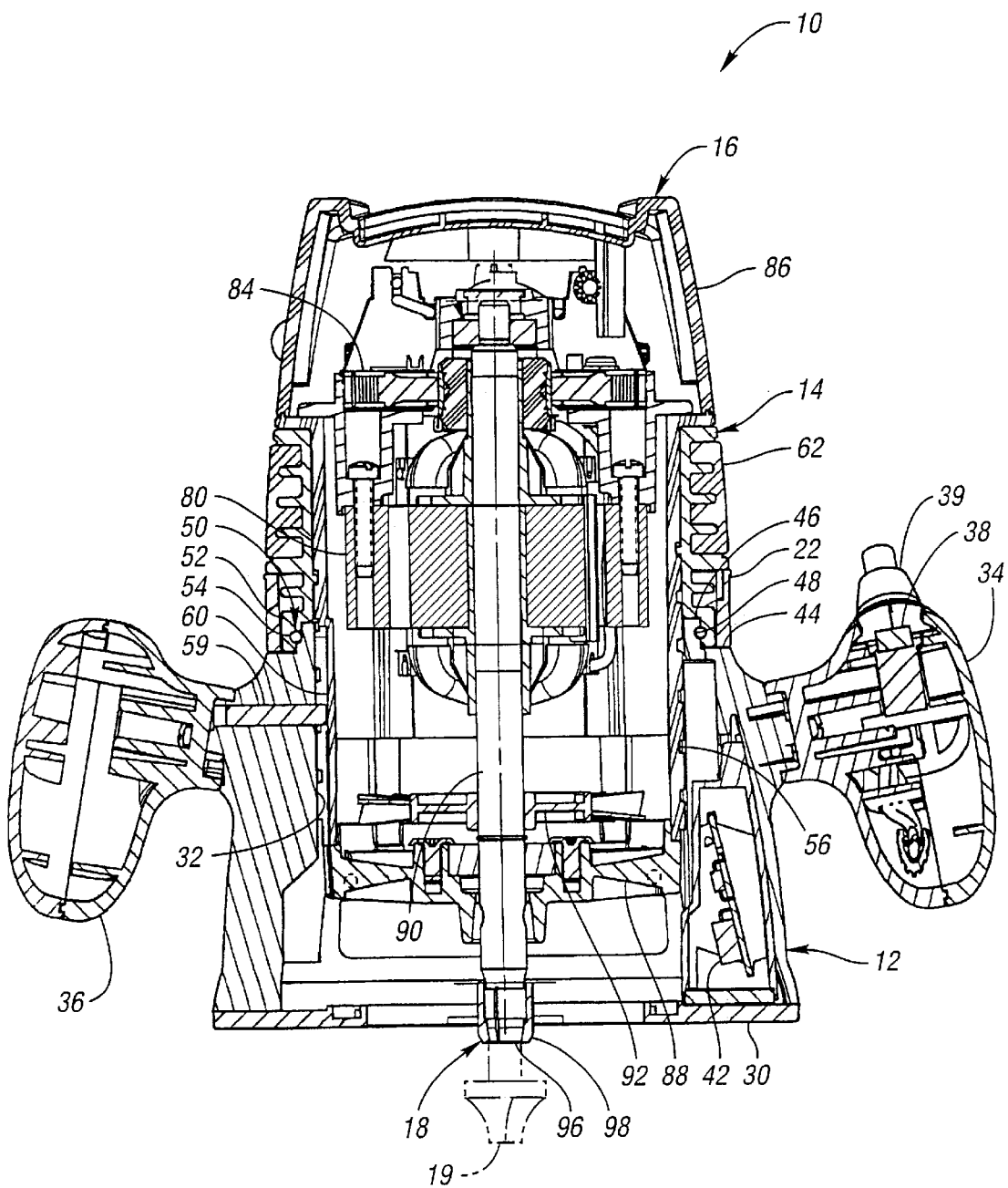
FIG. 5 is a partial section view of the fixed base router taken along section line 5—5 in FIG. 4.

The base 12, adjusting ring 14 and motor housing 16 cooperate such that rotation of the adjusting ring 14 imparts an axial translation to the motor housing 16. The motor housing 16 has an external thread 56 formed thereabout. The adjusting ring 14 includes a plurality of helix engagements therein, thus defining an internal thread 58 for threadably cooperating with the external thread 56 of the motor housing 16. The base 12 includes a pin 59 which extends within central bore 32 and cooperates within a longitudinal slot 60 which is formed within the exterior of the motor housing 16 as best illustrated in FIG. 5. The pin 59 prevents the motor housing 16 from rotating relative thereto. Rotation of the adjusting ring 14 threadably cooperates with the motor housing 16 to axially translate it, thus adjusting the router depth.

Alternatively, the invention contemplates that the base 12 may include an internal thread and the adjusting ring 14 may be adapted to prevent rotation of the motor housing relative thereto. Although this feature would allow a user to adjust the height of the motor housing 16 relative to the base 12, the motor housing 16 would rotate with the adjusting ring 14 as it axially translates about the threads within the base 12. The preferred embodiment, as illustrated, permits the motor housing 16 to move longitudinally only relative to the base 12 for avoiding difficulties caused by a change in orientation of a power cord or various adjustment features provided by the motor housing 16.

In order to provide ease to the user for adjusting the router depth, the adjusting ring includes an elastomeric grip 62 formed thereto, including a series of grip configurations. The coarse scale 22 is used for measuring the adjustment of router depth due to rotation of the adjusting ring 14. The coarse scale 22 is further defined as an annular ring secured about the adjusting ring 14, having a series of indicia formed or inscribed thereabout. Accordingly, a coarse indicator 64 is oriented on the base 12 for indicating relative coarse adjustment of the router depth due to rotation of the adjusting ring 14. The coarse scale 22 is rotatable with respect to the adjusting ring 14 for acting as a bezel so that a user may reset a measurement indication of the coarse scale 22 as desired.

Figure 6:
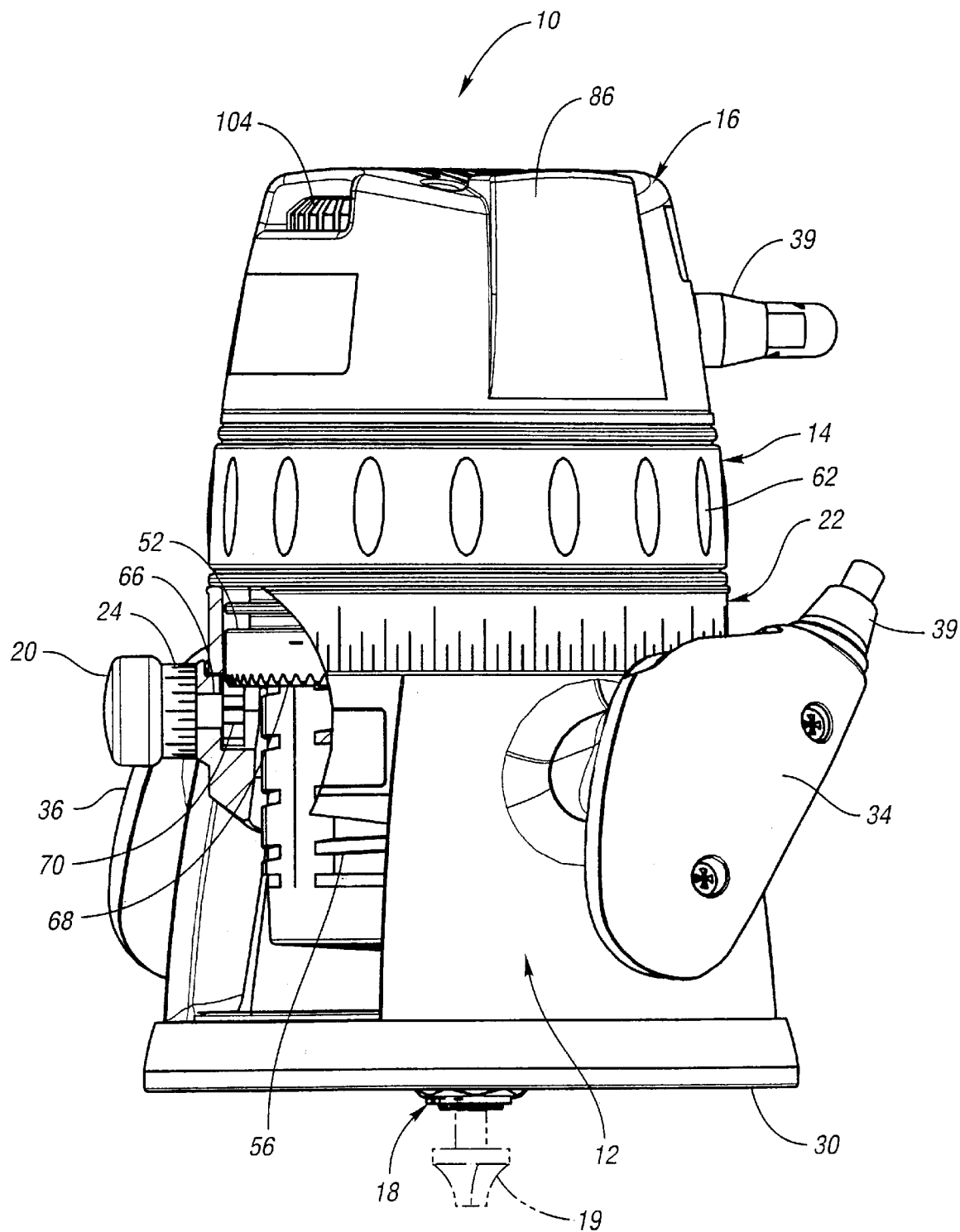
FIG. 6 is a partial section view of the fixed base router taken along section line 6—6 in FIG. 4.

The dial 20 cooperates with the adjusting ring 14 for providing the user with a relative fine adjustment of the router depth. The dial 20 is affixed to a dial shaft 66 which is journaled within the base 12 such that the dial 20 extends from the base 12 adjacent to the upper end of the base 12. As illustrated in FIGS. 2 and 6, the lower annular region 52 of the adjusting ring includes a series of gear teeth defining a ring gear 68. A pinion gear 70 is oriented within the base 12, affixed for rotation to the dial shaft 66, and engaged with the ring gear 68. The pinion gear 70 is coupled for rotation to the dial 20 such that a rotation imparted to the dial 20 by a user imparts a reduced rotation to the adjusting ring 14. Therefore, the dial 20 offers a relative fine adjustment of the router depth. For example, the reduction ratio between the dial 20 and adjusting ring 14 may be 10:1, such that the fine adjustment allows a user to adjust the router depth with accuracy and precision. The relative fine adjustment is measured by the fine scale 24 secured about the dial shaft 66, and corresponding fine indicator 72 which is oriented on the base 12. Similar to the coarse scale 22, the fine scale 24 is also further defined as an annular ring having a series of indicia formed or inscribed thereabout. The fine scale 24 is also rotational relative to the dial 20 for resetting the fine adjustment. The coarse indicator 64 and fine indicator 72 are oriented proximate to one another such that both coarse and fine adjustment may be viewed by the user simultaneously.

The fixed base router 10 includes a lever lock assembly 74 attached to the base 12 for constricting and releasing the internal diameter of the central bore 32. In an open position of the lever lock assembly 74, the motor housing 16 is free to move within the base 12 for adjustment of the router depth. Once a desired router depth is obtained, the lever lock assembly 74 may be toggled to a closed position causing the central bore 32 to constrict thus preventing any movement of the motor housing 16 relative to the base 12.

With reference now to FIGS. 3 and 5, the motor housing 16 is described in greater detail. The motor housing 16 includes a central housing portion 76 which is generally cylindrical and includes the external thread 56 formed thereabout. A motor 78 is enclosed within the central housing portion 76. The motor 78 includes a field unit 80 which generates an electromagnetic field and an armature 82 journaled for rotation relative to the field unit 80. A pair of brush assemblies 84 provide a source of current to the armature 82. The motor housing 16 includes a top cap 86 and an end plate 88 for enclosing the motor housing 16. The top cap 86 and end plate 88 are each vented for allowing the flow of air therethrough. The armature 82 includes an armature shaft 90 extending out of the motor housing 16 and through the end plate 88. A fan 92 is affixed to the armature shaft 90 for forcing air through the motor housing 16.

The lower portion of the armature shaft 90 includes the tool holder 18 for securing a cutting element or router bit therein. The tool holder 18 is further defined as a router collet having collet fingers 96 formed with the lower portion of the armature shaft 90, and a collet nut 98 for tightening and loosening the collet fingers 96. The motor housing 16 further includes a shaft lock assembly 100 for temporarily locking the armature shaft 90 for loosening and tightening of the collet nut 98.

The motor housing 16 includes a main power cord 102 for connection to 110 V AC. The flow of current through the motor housing 16 is regulated by the on/off switch 38 oriented upon the power handle 34 and electrically connected to the motor housing 16 by the cable 39. The motor housing 16 also includes a variable speed switch 104 for adjusting the rotational speed of the motor 78.

Figure 4:
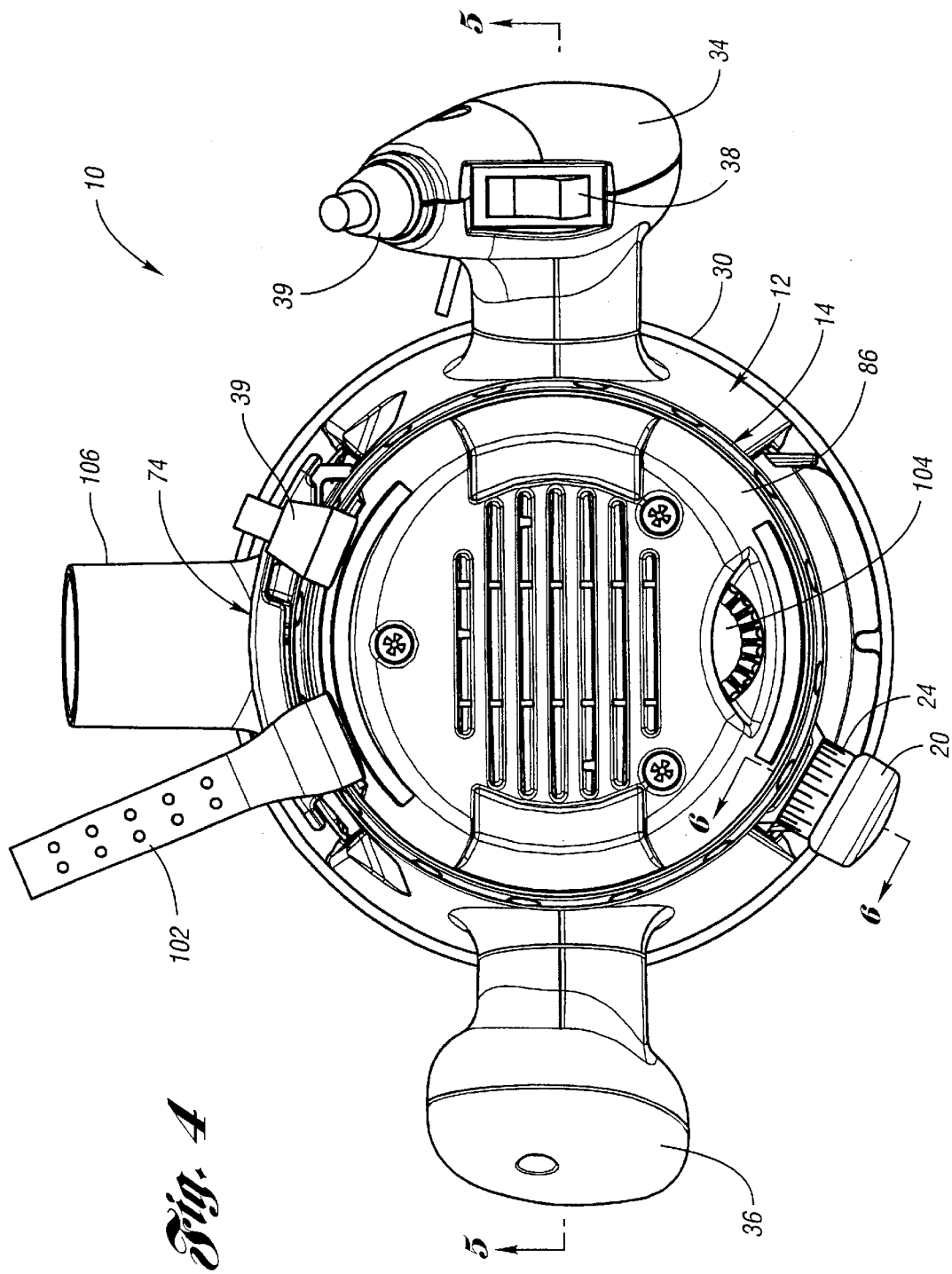
FIG. 4 is a top plan view of the fixed base router of FIG. 1.

Referring to FIG. 4, the base 12 may also include a dust port 106 for directing the flow of air, dust and material particles entrained within the air.

In summary, the present invention provides a fixed base router 10 having both coarse and fine adjustment which is accurate and precise and offers advantages of being cost effective, compact, and easy to use.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A fixed base router comprising:
    a base having a lower planar surface, an upper end, a central bore, and a handle affixed thereto;
    an adjusting ring rotatably affixed to the base upper end, coaxial with the central bore, the adjusting ring having a series of gear teeth defining a ring gear;
    a motor housing including a motor secured therein for imparting rotational movement to a tool holder extending from the motor housing, the motor housing having an external thread formed thereabout; and
    a pinion gear journaled for rotation relative to the base and engaged with the ring gear, the pinion gear having a dial which rotates with the pinion gear relative to the base;
    wherein one of the adjusting ring and base has an internal thread formed therein, engaged with the motor housing external thread, and the other of the adjusting ring and base is adapted to prevent rotation of the motor housing relative thereto, such that rotation of the adjusting ring axially translates the motor housing relative to the base; and
    wherein one of the base and dial includes a scale, and the other of the base and dial includes an indicator for indicating fine adjustment of the motor housing axial position relative to the base.

2. The fixed base router of claim 1, wherein the internal thread is formed within the adjusting ring and engaged with the motor housing external thread, and the base central bore is adapted to prevent rotation of the motor housing relative to the fixed base such that rotation of the adjusting ring threadably cooperates with the motor housing to axially translate the motor housing relative to the base.

3. The fixed base router of claim 1, wherein the motor housing has a longitudinal slot formed therealong and the base includes a pin extending from the base central bore and into the longitudinal slot.

4. The fixed base router of claim 1, wherein a user may rotate the adjusting ring for coarse adjustment of the motor housing axial position relative to the base, and the user may rotate the dial for fine adjustment of the motor housing axial position relative to the base.

5. The fixed base router of claim 1, further comprising a coarse scale oriented about the adjusting ring, and a corresponding indicator affixed to the base for indicating coarse adjustment of the motor housing axial position relative to the base.

6. The fixed base router of claim 5, wherein the coarse scale is further defined as an annular ring having a series of indicia formed thereabout, the coarse scale being rotatable relative to the adjusting ring.

7. The fixed base router of claim 1, wherein the fine adjustment scale is oriented about the dial and the fine adjustment indicator is affixed to the base.

8. The fixed base router of claim 7, wherein the scale is further defined as an annular ring having a series of indicia formed thereabout, the scale being rotatable relative to the dial.

9. A fixed base router comprising:
    a base having a lower planar surface, an upper end, a central bore and a handle affixed thereto;
    an adjusting ring rotatably affixed to the base upper end, coaxial with the central bore, the adjusting ring having an internal thread formed therein and a series of gear teeth defining a ring gear;
    a motor housing including a motor secured therein for imparting rotational movement to a tool holder extending from the motor housing, the motor housing having an external thread formed thereabout, being threadably engaged with the adjusting ring internal thread, and the motor housing being adapted to prevent rotation of the motor housing relative to the base such that rotation of the adjusting ring axially translates the motor housing relative to the base; and
    a pinion gear journaled for rotation relative to the base and engaged with the ring gear, the pinion gear having a dial which rotates with the pinion gear relative to the base;
    wherein one of the base and dial includes a scale, and the other of the base and dial includes an indicator for indicating fine adjustment of the motor housing axial position relative to the base.

10. The fixed base router of claim 9, wherein the motor housing has a longitudinal slot formed along the motor housing and the base includes a pin extending from the base central bore and into the longitudinal slot.

11. The fixed base router of claim 9, wherein a user may rotate the adjusting ring for coarse adjustment of the motor housing axial position relative to the base, and the user may rotate the dial for fine adjustment of the motor housing axial position relative to the base.

12. The fixed base router of claim 1, further comprising a coarse scale oriented about the adjusting ring, and a corresponding indicator affixed to the base for indicating coarse adjustment of the motor housing axial position relative to the base.

13. The fixed base router of claim 12, wherein the coarse scale is further defined as an annular ring having a series of indicia formed thereabout, the coarse scale being rotatable relative to the adjusting ring.

14. The fixed base router of claim 9, wherein the fine adjustment scale is oriented about the dial and the fine adjustment indicator is affixed to the base.

15. The fixed base router of claim 14, wherein the scale is further defined as an annular ring having a series of indicia formed thereabout, the scale being rotatable relative to the dial.

16. A fixed base router comprising:

a base having a lower planar surface, an upper end, a central bore, a pin projecting into the central bore, and a handle affixed to the base;

an adjusting ring rotatably affixed to the base upper end, coaxial with the central bore, the adjusting ring having an internal thread formed therein and a series of gear teeth defining a ring gear;

a motor housing including a motor secured therein for imparting rotational movement to a tool holder extending from the motor housing, the motor housing having an external thread formed thereabout, being threadably engaged with the adjusting ring internal thread, and the motor housing including a longitudinal slot formed therealong and cooperating with the pin on the base for preventing rotation of the motor housing relative to the base such that rotation of the adjusting ring axially translates the motor housing relative to the base; and a pinion gear journaled for rotation relative to the base and engaged with the ring gear, the pinion gear having a dial which rotates with the pinion gear relative to the base;

wherein the adjusting ring includes a scale and the base includes an indicator for indicating coarse adjustment of the motor housing axial position relative to the base;

wherein the dial includes a scale and the base includes an indicator for indicating fine adjustment of the motor housing axial position relative to the base; and wherein a user may rotate the adjusting ring for coarse adjustment of the motor housing axial position relative to the base, and the user may rotate the dial for fine adjustment of the motor housing axial position relative to the base.

17. A fixed base attachment for a router, the fixed base attachment comprising:

a base having a lower planar surface, an upper end, a central bore and a handle affixed to the base, the central bore being sized to receive an externally threaded motor housing which includes a motor secured therein for imparting rotational movement to a tool holder extending from the motor housing, and the central bore being adapted to prevent rotation of the motor housing relative to the base;

an adjusting ring rotatably affixed to the base upper end, coaxial with the central bore, the adjusting ring having an internal thread formed therein for threadably cooperating with a motor housing external thread such that rotation of the adjusting ring axially translates the motor housing relative to the base, and the adjusting ring having a series of gear teeth defining a ring gear; and a pinion gear journaled for rotation relative to the base and engaged with the ring gear, the pinion gear having a dial which rotates with the pinion gear relative to the base;

wherein one of the base and dial includes a scale, and the other of the base and dial includes an indicator for indicating fine adjustment of the motor housing axial position relative to the base.

* * * * *